(12) United States Patent
Maljaars et al.

(10) Patent No.: US 11,796,421 B2
(45) Date of Patent: Oct. 24, 2023

(54) DEVICE FOR MONITORING A BEARING, ASSOCIATED METHOD, SYSTEM AND MACHINE

(71) Applicant: AKTIEBOLAGET SKF, Gothenburg (SE)

(72) Inventors: Elizabertus Maljaars, Houten (NL); Alireza Azarfar, Utrecht (NL); Kareem Gouda, Utrecht (NL); Lambert Karel van Vugt, Media, PA (US); Cornelis Harm Taal, Utrecht (NL)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/683,854

(22) Filed: Mar. 1, 2022

(65) Prior Publication Data

US 2023/0280239 A1  Sep. 7, 2023

(51) Int. Cl.
*G01M 13/045* (2019.01)

(52) U.S. Cl.
CPC .................. *G01M 13/045* (2013.01)

(58) Field of Classification Search
None
See application file for complete search history.

(56) References Cited

U.S. PATENT DOCUMENTS

2018/0011065 A1* 1/2018 Bowers, III ....... G01N 29/4427

OTHER PUBLICATIONS

Mauricio, A. et al., "Bearing diagnostics under strong electromagnetic interference based on Integrated Spectral Coherence", Mechanical Systems and Signal Processing, vol. 140, Jun. 2020 (available online Feb. 13, 2020) 106673, ISSN 0888-3270 https://www.sciencedirect/science/article/abs/pii/S0888327020300595?via%3Dihub.

* cited by examiner

*Primary Examiner* — Raul J Rios Russo
*Assistant Examiner* — Carl F. R. Tchatchouang
(74) *Attorney, Agent, or Firm* — J-TEK LAW PLLC; Scott T. Wakeman; Mark A. Ussai

(57) ABSTRACT

A monitoring device for monitoring a bearing in an electromagnetic field environment includes a vibration sensor for delivering at least one measurement that includes at least one vibration frequency generated by a bearing, and a processing module that includes a first processing module configured to determine at least one normalized measured value from the at least one vibration frequency, a filtering module configured to compare the normalized measured value to at least one predetermined normalized reference value indicative of electromagnetic phenomena acting on the bearing, and a second processing module configured to process the at least one vibration frequency to determine a bearing defect if the normalized measured value is different from the at least one predetermined normalized reference value.

11 Claims, 5 Drawing Sheets

FIG.7

DEVICE FOR MONITORING A BEARING, ASSOCIATED METHOD, SYSTEM AND MACHINE

TECHNOLOGICAL FIELD

The present invention relates to rolling bearings in electromagnetic fields.

More particularly, the invention deals with a method and a device for monitoring a rolling bearing in an electromagnetic field.

The invention further relates to a system comprising such a device and a machine comprising such a system.

BACKGROUND

Known condition monitoring methods of the bearing are based on vibration signals detected by sensors attached on the bearing or bearing surrounding.

The sensors are connected to monitoring devices implementing the condition monitoring methods.

The methods permit to detect and identify a defect of the bearing by comparing the frequencies of the vibrations with known vibration signatures of bearing defects.

If the frequencies of the vibrations are similar to at least one vibration signature, an alarm is raised.

When the bearing is subjected to electromagnetic interferences, for example when the bearing is arranged in or near an electrical rotating machine, the electromagnetic field generated by coils of the machine, can interfere with the bearing and the monitoring device so that the signature of electromagnetic interference at particular operating conditions of the bearing may coincide with the vibration signature of a bearing defect.

The electromagnetic field may for example be generated by variable frequency drivers or power converters.

In such cases, a false alarm is raised due to electromagnetic interferences.

SUMMARY

Consequently, the present invention intends to improve the accuracy of condition monitoring of a rolling bearing in an electromagnetic field environment.

According to an aspect, a method for monitoring a bearing coupled to a monitoring device in an electromagnetic field environment is proposed.

The method comprises:
providing at least one measurement of a vibration sensor of the monitoring device, the least one measurement comprising at least one vibration frequency generated by the bearing,
determining at least one normalized measured value from the at least one vibration frequency,
filtering the normalized measured value by a filtering module of the monitoring device to compare the normalized measured value to at least one predetermined normalized reference value indicative of electromagnetic phenomena acting on the bearing and the monitoring device,
processing the at least one vibration frequency to determine a bearing defect if the normalized measured value is different from the at least one predetermined normalized reference value.

The measured vibration frequency is only processed if it is not impacted by electromagnetic interferences to avoid false alarms during bearing monitoring based in vibrations analysis.

As such, bearing defect condition indicators are not impacted by electromagnetic interferences.

The one normalized measured value comprises the at least one vibration frequency measured by the vibration sensor or a repetition order value equal to the at least one vibration frequency measured divided by the bearing rotation speed.

Advantageously, processing the at least one vibration frequency comprises comparing the at least one vibration frequency to a least one predetermined identification frequency indicative of a bearing defect.

Preferably, the method comprises discarding the at least one vibration frequency if the at least one normalized measured value is equal to the at least one predetermined normalized reference value.

Advantageously, determining the at least one normalized measured value comprises assigning the at least one vibration frequency to the at least one normalized measured value so that both values are equal, the at least one predetermined normalized reference value comprising at least one predetermined reference frequency.

Preferably, determining the at least one normalized measured value comprises:
determining the rotational speed of the bearing, and
determining a repetition order value by dividing the at least one frequency by the rotational speed of the bearing,
the at least one predetermined normalized reference value comprising at least one predetermined reference order, the determination of the at least one predetermined reference order comprising dividing at least one predetermined variable reference frequency by the rotational speed of the bearing.

Advantageously, the bearing and the monitoring device are located near or in an electrical machine so that the bearing and the monitoring device are subjected to electromagnetic phenomena generated by the electrical machine, the step of filtering comprising comparing the normalized measured value to the at least one predetermined normalized reference value indicative of the electromagnetic phenomena acting on the bearing and the monitoring device according to the frequency of the electromagnetic phenomena.

Preferably, the electrical machine comprising an electrical rotating machine, the method comprises a step of determining the filtering module from features of the electrical rotating machine, the frequency of a grid connected to the machine, the rotating speed of the machine and at least one predetermined integer representative of the range of the at least one predetermined normalized reference value.

Advantageously, determining the filtering module comprises:
determining a first relationship between a first variable, the grid frequency and the predetermined integer,
determining a second relationship between a second variable, features of the electrical rotating machine, the rotating speed, the grid frequency and the predetermined integer, and
determining a third relationship between a third variable, features of the electrical rotating machine, the rotating speed, the grid frequency and the predetermined integer, the first, second and third variables forming the predetermined variable frequencies, According to another aspect, a monitoring device for monitoring a bearing in an electromagnetic field environment is proposed.

The monitoring device comprises:
  a vibration sensor for delivering at least one measurement comprising at least one vibration frequency generated by a bearing, and
  a processing module comprising:
  a first processing module configured to determine at least one normalized measured value from the at least one vibration frequency,
  a filtering module compare the normalized measured value to at least one predetermined normalized reference value indicative of electromagnetic phenomena acting on the bearing, and
  a second processing module configured to process the at least one vibration frequency to determine a bearing defect if the normalized measured value is different from the at least one predetermined normalized reference value.

Preferably, the processing module comprises:
  a transmitter configured to transmit the at least one measurement,
  a receiving device configured to receive the at least one measurement from the transmitter, and
  a server device connected to the receiving device and implementing:
  the first processing module comprising a first algorithm to determine at least one normalized measured value from the at least one vibration frequency,
  the filtering module comprising a second algorithm to compare the normalized measured value to at least one predetermined normalized reference value indicative of electromagnetic phenomena acting on the bearing, and
  the second processing module comprising a third algorithm to process the at least one vibration frequency to determine a bearing defect if the normalized measured value is different from the at least one predetermined normalized reference value.

Advantageously,:
  the first processing module comprises a first processing unit for determining at least one normalized measured value from the at least one vibration frequency,
  the filtering module comprises a filtering device to compare the normalized measured value to at least one predetermined normalized reference value indicative of electromagnetic phenomena acting on the bearing, and
  the second processing module comprises a second processing unit to process the at least one vibration frequency to determine a bearing defect if the normalized measured value is different from the at least one predetermined normalized reference value.

Preferably, the second processing module is configured to compare the at least one vibration frequency to a least one predetermined identification frequency indicative of a bearing defect.

Advantageously, the second processing module is configured to discard the at least one vibration frequency if the at least one normalized measured value is equal to the at least one predetermined normalized reference value.

Preferably, the at least one normalized measured value comprises the at least one vibration frequency.

Advantageously, the at least one normalized measured value comprises at least one predetermined reference order and the at least one normalized measured value comprises at least one repetition order value, the first processing module being configured to determine the at least one repetition order value by dividing the at least one vibration frequency by the rotational speed of the bearing.

According to a characteristic, the bearing and the monitoring device are located near an electrical machine so that the bearing is subjected to electromagnetic phenomena generated by the electrical machine, the filtering module being configured to compare the normalized measured value to the at least one predetermined normalized reference value indicative of the electromagnetic phenomena acting on the bearing according to the frequency of the electromagnetic phenomena.

Advantageously, the filtering module is configured to determine the at least one predetermined normalized reference value from features of the electrical machine comprising an electrical rotating machine, the frequency of a grid connected to the rotating machine, the rotating speed of the rotating machine and a predetermined integer representative of the range of the at least one predetermined normalized reference value.

Preferably, the filtering module is configured to:
  determine a first relationship between a first variable, the grid frequency and the predetermined integer,
  determine a second relationship between a second variable, features of the electrical rotating machine, the rotating speed, the grid frequency and the predetermined integer, and
  determine a third relationship between a third variable, features of the electrical rotating machine, the rotating speed, the grid frequency and the predetermined integer, the first, second and third variables forming the predetermined variable frequencies.

According to another aspect, a system comprising a bearing and a monitoring device for monitoring the bearing as defined above is proposed.

Preferably, the system further comprises an electrical machine, the bearing and the monitoring device being located near to the electrical machine so that the bearing and the monitoring device are subjected to electromagnetic phenomena generated by the electrical machine.

Advantageously, the electrical machine is a rotating electrical machine.

According to another aspect, a machine comprising a system as defined above is proposed.

According to another aspect, a wind turbine comprising a propeller and a system as defined above, the propeller being coupled to a shaft of the electrical rotating machine is proposed.

BRIEF DESCRIPTION OF THE DRAWINGS

Other advantages and features of the invention will appear on examination of the detailed description of embodiments, in no way restrictive, and the appended drawings in which.

DETAILED DESCRIPTION

Figure 1:
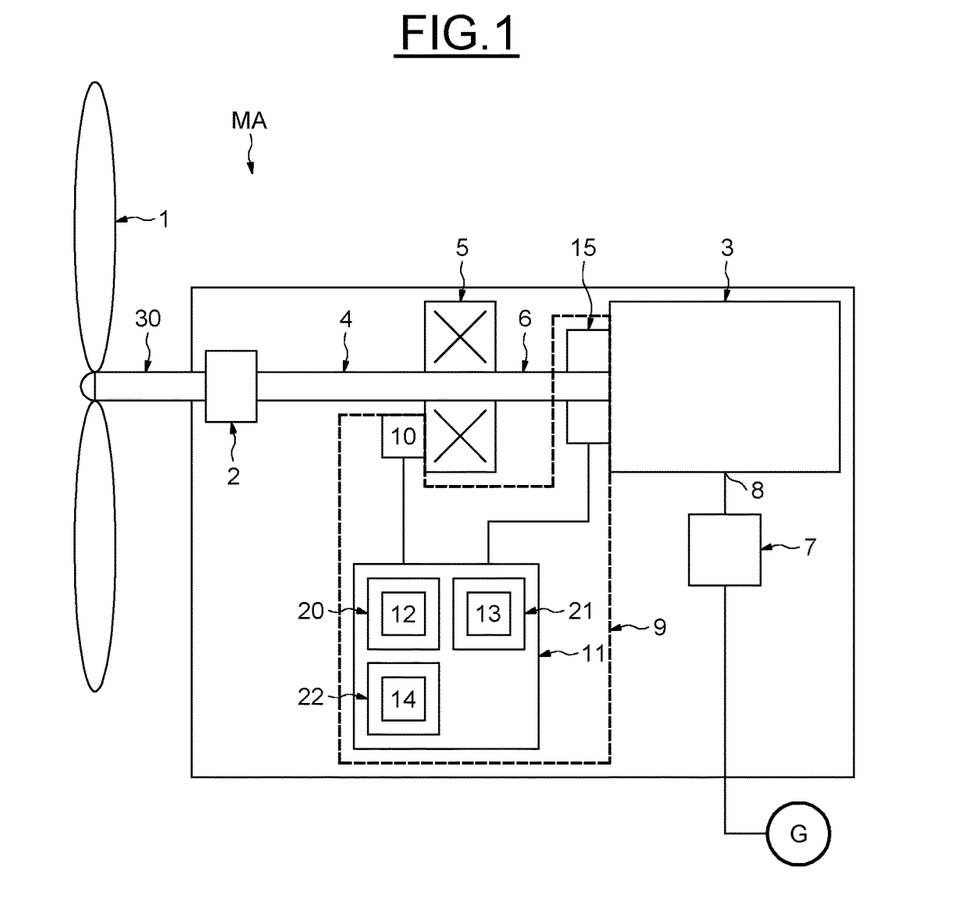
FIG. 1 illustrates schematically a machine according to the invention.

Reference is made to FIG. 1 which represents an example of a machine MA.

The machine MA is for example an electrical rotating machine 3 of a wind turbine comprising a propeller 1, a gearbox 2 coupled to the propeller 1 by a first shaft 30, the electrical rotating machine 3 being coupled to the gearbox 2 by a second shaft 4.

The wind turbine further comprises a bearing 5 maintaining in rotation the second shaft 4.

The electrical machine 3 comprises windings at a stator and/or a rotor of the machine 3 generating electromagnetic fields.

As the bearing 5 is located near to the electrical rotating machine 3, the bearing 5 is subjected to repetitive electromagnetic phenomena generated by the electrical rotating machine 3.

The second shaft 4 is coupled with a rotor shaft 6 of the rotor of the electrical rotating machine 3.

The wind turbine 1 may comprise more than one bearing to maintain the second shaft 4 in rotation.

The wind turbine 1 may comprise at least one additional bearing to maintain the first shaft 30 in rotation.

The wind turbine 1 further comprises a power conversion module 7 connected to an output 8 the electrical machine 3 and connected to a grid G.

The power conversion module 7 converts the electrical energy generated by the machine 3 driven by the propeller 1 so that the converted electrical energy supplies the grid G.

The wind turbine 1 further comprises a monitoring device 9 for monitoring the bearing 5.

The machine MA may comprise another kind of machine comprising a bearing to be monitored.

The machine MA comprises for example a frequency driver and/or a power converter generating electromagnetic phenomena.

The device 9 comprises a vibration sensor 10 delivering at least one measurement comprising at least one vibration frequency F2.

The vibration sensor 10 may be provided on the bearing 5 or located remotely from the bearing 5.

The device 9 further comprises a processing module 11 connected to the vibration sensor 10 and comprising a first processing module 20 including a first processing unit 12, a filtering module 21 including a filtering device 13, and a second processing module 22 including a second processing unit 14.

The device 9 comprises a rotational speed sensor 15 to measure the rotational speed of the shaft 6 of the electrical rotating machine 3 and connected to the processing module 11.

In variant, the rotational speed of the shaft 6 is estimated by processing the measurements delivered by the vibration sensor 10.

In another variant, the rotational speed of the shaft 6 is delivered by a controller (not represented) of the machine MA.

As the device 9 is located near to the electrical rotating machine 3, the processing module 11 comprising the vibration sensor 10, the first processing unit 12, the filtering device 13, the second processing unit 14 is subjected to repetitive electromagnetic phenomena generated by the electrical rotating machine 3.

Further, as the cabling between processing module 11 and the vibration sensor 10, and the cabling between the rotational speed sensor 15 and the processing unit 11 are exposed to the electromagnetic fields generated by the electrical machine 3, they may act as antennas receiving electromagnetic disturbance that may coincide with the vibration signature of a bearing defect.

Figure 2:
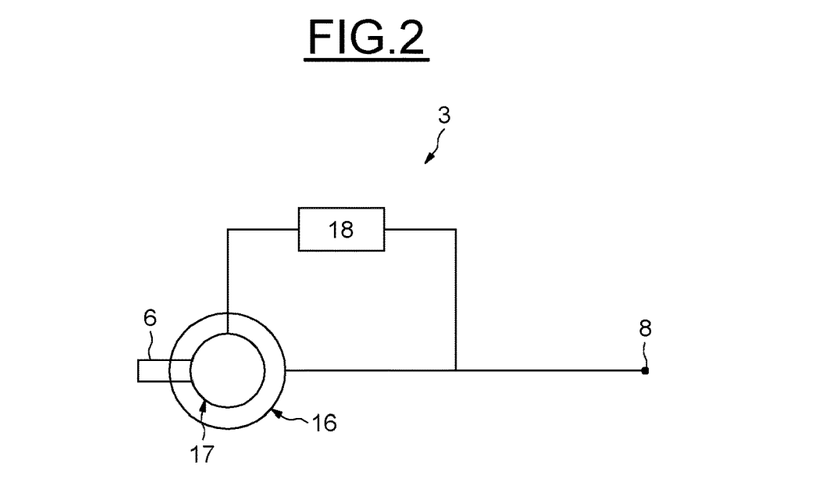
FIG. 2 illustrates schematically an example of an example of an electrical rotating machine according to the invention.

FIG. 2 represents an example of the electrical rotating machine 3 comprising a doubly fed electric machine.

The machine 3 comprises a stator 16, a rotor 17 comprising the rotor shaft 6. The stator 16 comprises stator coils and the rotor 17 comprises rotor coils.

The stator coils are connected to the output 8.

The machine 3 further comprises a supply power conversion module 18 connecting the stator coils to the output 8.

In the following, examples of implementation of the device 9 are presented.

The filtering device 13 compares at least one normalized measured value determined from one measurement delivered by the vibration sensor 10 to at least one predetermined normalized reference value indicative of electromagnetic phenomena acting on the bearing 5 and the device 9 according to the frequency of the electromagnetic phenomena.

To simplify the examples of implementation, it is assumed that the power conversion module 7 does not generate an electromagnetic field.

The electromagnetic phenomena are only generated by the electrical rotating machine 3, the electrical rotating machine 3 generating repetitive electromagnetic phenomena depending on the frequency of the rotating speed S2 of the machine 3.

Before implementing the device 9, the filtering device 13 is configured to determine at least one predetermined normalized reference value.

An example of a method for configuring the filtering device 13 is presented.

The filtering device 13 is configured from features of the electrical rotating machine 3, the frequency of the grid G, the rotating speed S2 of the machine 3, and a predetermined integer k representative of the range of the at least one predetermined normalized reference value.

The features of the electrical rotating machine 3 comprise a machine dependent integer c1 equal to the number of poles of the machine 3 multiplied by the number of phases of the machine 3. For example, the machine 3 has four poles and three phases so that c1 is equal to twelve.

A first relationship between a first variable RF1, the grid frequency F1 and the predetermined integer k is determined.

$$RF1 = 2 \cdot F1 \cdot k \tag{1}$$

A second relationship between a second variable RF2, the machine dependent integer c1, the rotating speed $\Omega$ measured by the sensor 15, the grid frequency F1 and the predetermined integer k is determined.

$$RF2 = c1 \cdot 2 \cdot \Omega + 2 \cdot F1 \cdot k \tag{2}$$

A third relationship between a third variable RF3, the machine dependent integer c1, the rotating speed $\Omega$ measured by the sensor 15, the grid frequency F1 and the predetermined integer k is determined.

$$RF3 = -c1 \cdot 2 \cdot \Omega + 2 \cdot F1 \cdot k \tag{3}$$

The first, second and third variables RF1, RF2, RF3 form predetermined variable frequencies indicative of electromagnetic phenomena generated by the machine 3 and acting on the bearing 5.

A set of predetermined integer k comprising at least one predetermined integer k is chosen according to the rotating speed 1 so that all values of rotating speed reached by the rotating electrical machine are included in the predetermined variable frequencies.

Figure 3:
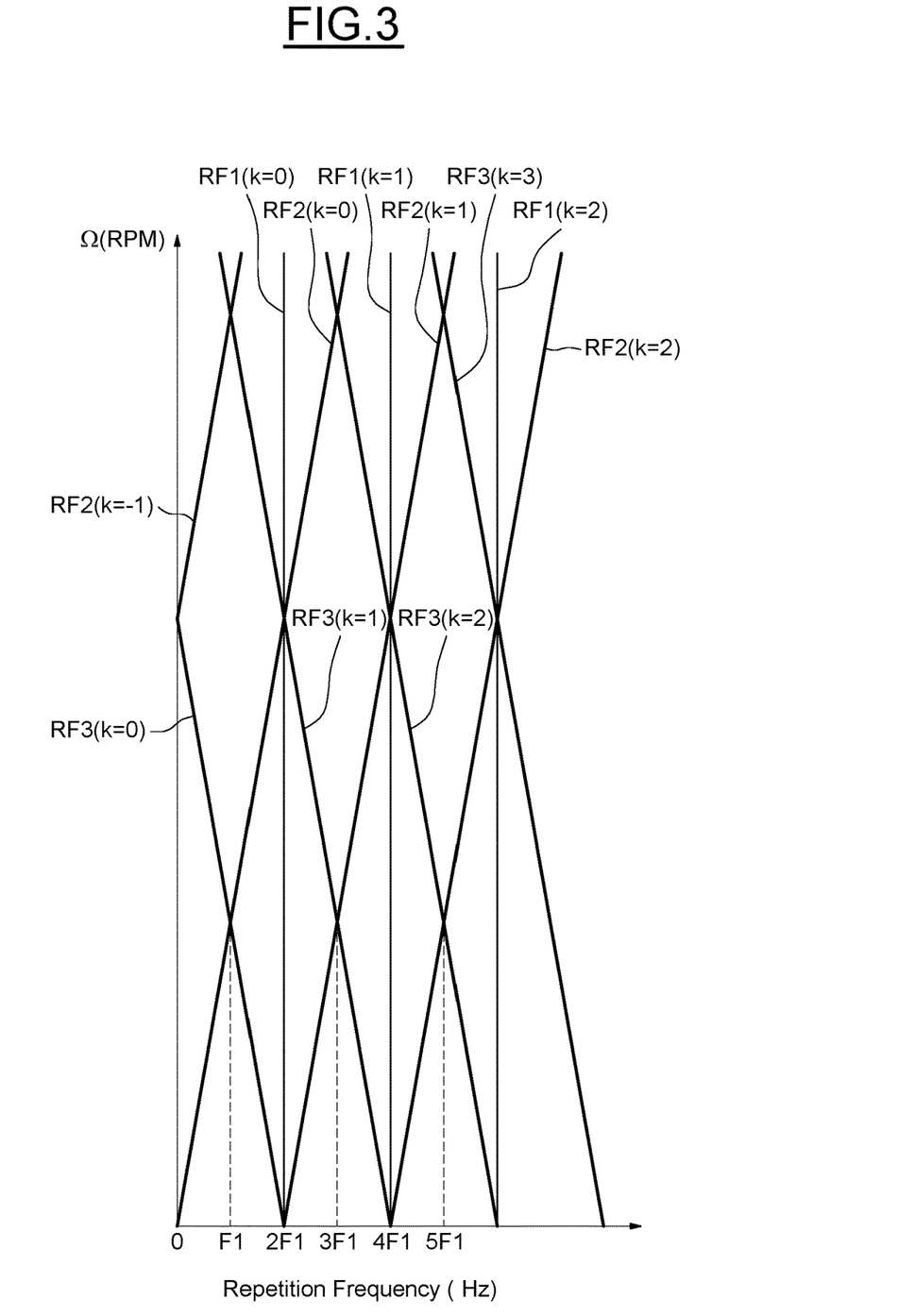
FIG. 3 illustrates a first example of a configuration of a filtering device according to the invention.

FIG. 3 illustrates a first example of a configuration of the filtering device 13.

The predetermined variable frequencies RF1, RF2, RF3 are represented according to the frequency of the electromagnetic phenomena and the rotating speed for example in revolution per minute RPM for different values of the predetermined integer k.

Figure 4:
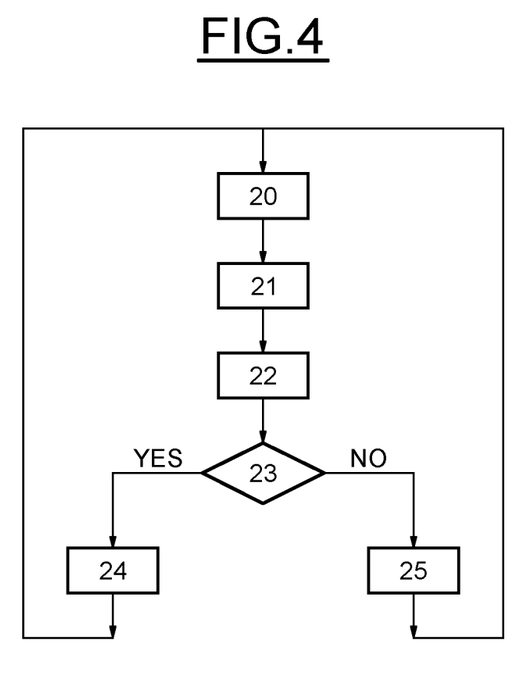
FIG. 4 illustrates a first example of a method for monitoring the bearing in an electromagnetic field environment according to the invention.

FIG. 4 illustrates a first example of a method for monitoring the bearing 5 in an electromagnetic field environment.

It is assumed that the filtering device 13 is configured as described above.

In a step 20, the vibration sensor 10 delivers at least one measurement comprising the vibration frequency F2.

In step 21, the first processing unit 12 determines at least one normalized measured value from the vibration frequency F2.

The first processing unit 12 assigns the vibration frequency F2 to the at least one normalized measured value so that both values are equal.

In step 22, the filtering device 13 compares the vibration frequency F2 to a set of predetermined normalized reference values indicative of electromagnetic phenomena acting on the bearing 5 and the device 9.

The set of predetermined normalized reference values comprises the predetermined variable frequencies RF1, RF2, RF3 according to the rotating speed $\Omega$.

If the vibration frequency F2 is equal to at least one of the predetermined variable frequencies RF1, RF2, RF3 determined according to the rotating speed $\Omega$ for a predetermined integer k (step 23), it is assumed that the measurement is impacted by electromagnetic phenomena so that the measurement is impacted by electromagnetic interferences generated by the machine 3.

In step 24, the measurement comprising the vibration frequency F2 is discarded. It goes back to step 20.

If the at least one frequency F2 is not equal to the predetermined variable frequencies RF1, RF2, RF3 determined according to the rotating speed $\Omega$ for a predetermined integer k (step 23), it is assumed that the measurement is not impacted by electromagnetic phenomena.

In step 25, the second processing unit 14 determines a bearing defect from the vibration frequency F2 by comparing the signature of the measurement to predetermined signatures of bearing defects.

Each bearing defect has a unique signature so that the kind of defect is identified.

The identified defects are for example an inner ring defect, an outer ring defect, rolling element defect, misalignment, unbalance, cage defect.

It goes back to step 20.

Figure 5:
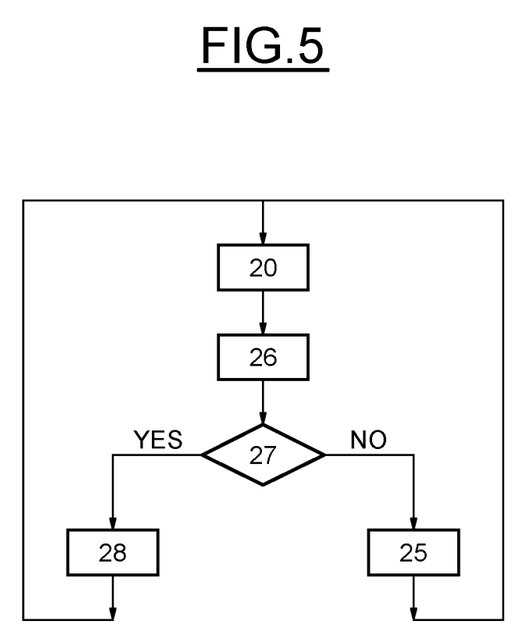
FIG. 5 illustrates a second example of a method for monitoring the bearing in an electromagnetic field environment according to the invention.

FIG. 5 illustrates a second example of a method for monitoring the bearing 5 in an electromagnetic field environment.

It is assumed that the filtering device 13 is configured as described above.

Further, in the second example of implementation of the device 9, the method for configuring the filtering device 13 comprises an additional step wherein the predetermined variable frequencies RF1, RF2, RF3 are divided by the rotational speed of the bearing 3 to determine predetermined reference orders ROik:

$$ROi(k) = \frac{RFi(k)}{\Omega} \qquad (4)$$

where i varies from 1 to 3.

Figure 6:
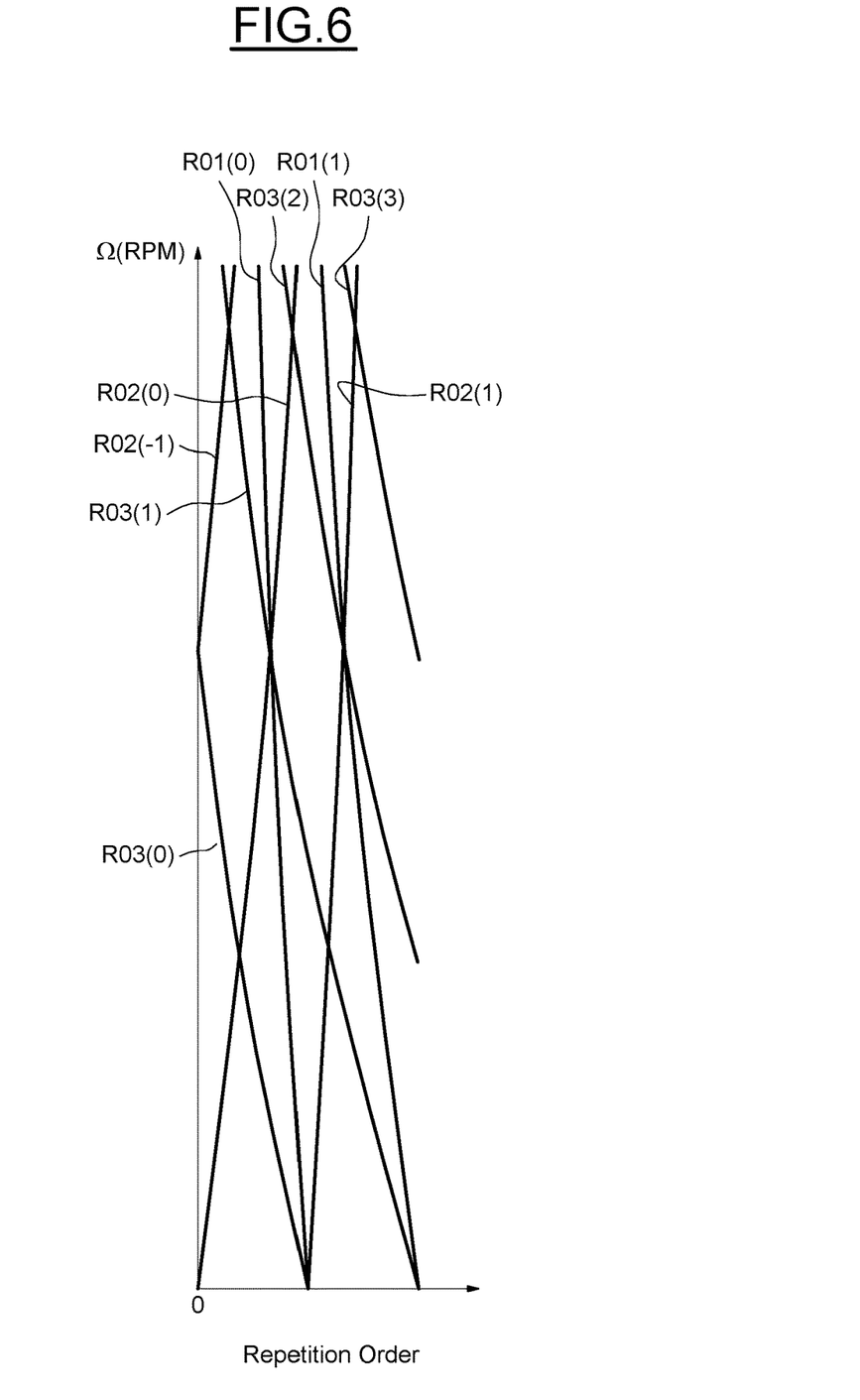
FIG. 6 illustrates a second example of a configuration of a filtering device according to the invention.

FIG. 6 illustrates a second example of a configuration of the filtering device 13 comprising the predetermined reference orders ROik.

Going back to FIG. 5, in step 20, the vibration sensor 10 delivers at least one measurement comprising the vibration frequency F2.

In step 26, the first processing unit 12 determines at least one normalized measured value from the vibration frequency F2.

The one normalized measured value comprises a repetition order value.

The first processing unit 12 determines a repetition order value ROV by dividing the vibration frequency F2 by the rotational speed of the bearing 5.

The rotational speed of the bearing 5 is measured by an additional rotational speed sensor measuring the rotational speed of the bearing 5.

In variant, the rotational speed of the shaft 6 is estimated by processing the measurements delivered by the vibration sensor 10.

In another variant, the rotational speed of the shaft 6 is delivered by a controller (not represented) of the machine MA.

In variant, it is assumed that the rotational speed of the bearing is equal to the rotational speed measured by the sensor 15, the device 9 comprising one rotational speed sensor.

If the repetition order value ROV is equal to at least one of the predetermined reference orders ROik (step 27), it is assumed that the measurement is impacted by electromagnetic phenomena so that the measurement is impacted by electromagnetic interferences generated by the machine 3.

In step 28, The measurement comprising the vibration frequency F2 is discarded.

It goes back to step 20.

If the repetition order value ROV is not equal to the predetermined reference orders ROik (step 27), it is assumed that the measurement is not impacted by electromagnetic phenomena.

It goes on to step 25.

The second processing unit 14 determine a bearing defect from the vibration frequency F2 by comparing the signature of the measurement to predetermined signatures of bearing defects comprising predetermined identification frequencies, each predetermined identification frequency being indicative of a bearing defect.

Each bearing defect has a unique signature so that the kind of defect is identified.

The identified defects are for example an inner ring defect, an outer ring defect, rolling element defect, misalignment, unbalance, cage defect.

It goes back to step 20.

The device 9 permits to provide bearing defect condition indicators that are not impacted by electromagnetic interferences to avoid false alarms during bearing monitoring based in vibrations analysis by discarding measurements impacted by electromagnetic phenomena.

As the filtering device 13 is configured from features of the electrical rotating machine, the frequency of the grid G, the rotating speed of the machine 3 and the predetermined integer k, the filtering device 13 is easily configurable.

Figure 7:
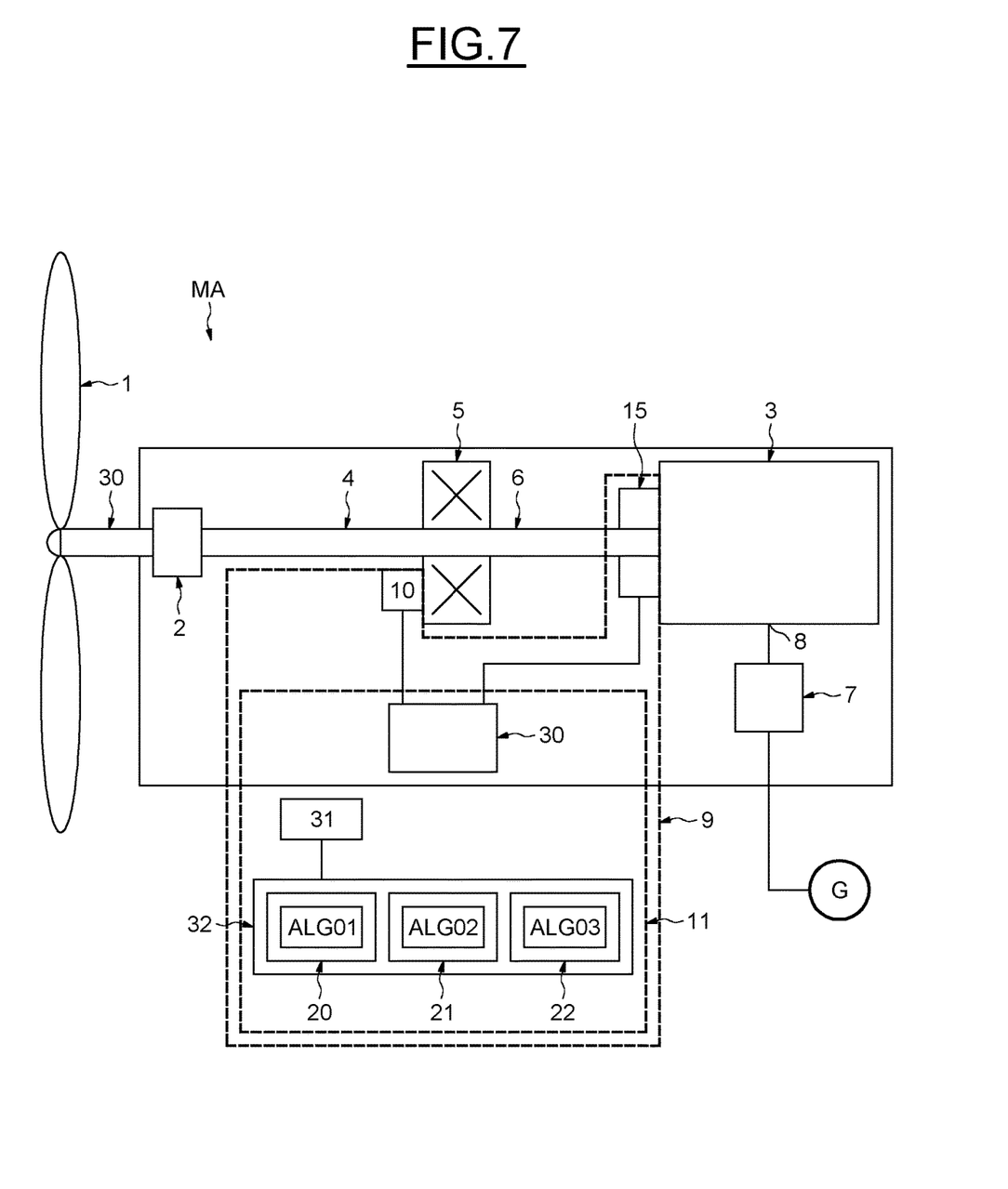
FIG. 7 illustrates another example of the device for monitoring the bearing in an electromagnetic field environment according to the invention.

FIG. 7 illustrates another embodiment of the monitoring device 9. It is to find the machine MA comprising the wind turbine comprising another embodiment of the monitoring device 9.

In contrary to the monitoring device 9 illustrates on FIG. 1, the processing module 11 comprises a transmitter 30 to transmit measurements of the rotational speed sensor 15, a receiving device 31 receiving the measurements transmitted by the transmitter 30, and a server device 31.

The transmitter 30 may located in the machine MA, and the receiving device 31 and the server 32 may be located outside the machine MA, the transmitter 30 and the receiving device 31 communicating wirelessly for example communicating by electromagnetic waves such as radio waves or wifi.

The server 32 comprises the first processing module 20 comprising a first algorithm ALGO1 to determine at least one normalized measured value from the at least one vibration frequency.

The server 32 further comprises the filtering module 21 comprising a second algorithm ALGO2 to compare the normalized measured value to at least one predetermined normalized reference value indicative of electromagnetic phenomena acting on the bearing, and the second processing module 22 comprising a third algorithm ALGO3 to process the at least one vibration frequency to determine a bearing defect if the normalized measured value is different from the at least one predetermined normalized reference value.

The device 9 comprising the server device 31 forms a centralized computing system.

In this embodiment of the processing module 11, the first processing unit 12 of the embodiment illustrates on FIG. 2 is replaced by the first algorithm ALGO1 performing the tasks of the first processing unit 12 described above, the second processing unit 14 of the embodiment illustrates on FIG. 2 is replaced by the third algorithm ALGO3 performing the tasks of the second processing unit 14 described above, and the filtering unit 13 of the embodiment illustrates on FIG. 2 is replaced by the second algorithm ALGO2 performing the tasks of the filtering unit 13 described above.

The algorithms ALGO1, ALGO2, AGLO3 centralized on the server device 31 are easy to update as they are stored in the same server device 31 and the coordination between the algorithms ALGO1, ALGO2, AGLO3 is enhanced.

What is claimed is:

1. A method for monitoring a bearing coupled to a monitoring device in an electromagnetic field environment comprising:
   providing at least one measurement of a vibration sensor of the monitoring device, the least one measurement comprising at least one vibration frequency generated by the bearing,
   determining at least one normalized measured value from the at least one vibration frequency,
   filtering the normalized measured value by a filtering module of the monitoring device to compare the normalized measured value to at least one predetermined normalized reference value indicative of electromagnetic phenomena acting on the bearing and the monitoring device,
   processing the at least one vibration frequency to determine a bearing defect if the normalized measured value is different from the at least one predetermined normalized reference value, and
   outputting an alarm if the vibration analysis indicates a bearing defect.

2. The method according to claim 1, wherein processing the at least one vibration frequency comprises: comparing the at least one vibration frequency to a least one predetermined identification frequency indicative of a bearing defect.

3. The method according to claim 1, comprising discarding the at least one vibration frequency if the at least one normalized measured value is equal to the at least one predetermined normalized reference value.

4. The method according to claim 1, wherein determining the at least one normalized measured value comprising assigning the at least one vibration frequency to the at least one normalized measured value so that both values are equal, the at least one predetermined normalized reference value comprising at least one predetermined variable reference frequency.

5. The method according to claim 1, wherein determining the at least one normalized measured value comprises:
   determining the rotational speed of the bearing, and
   determining a repetition order value by dividing the at least one vibration frequency by the rotational speed of the bearing, the at least one predetermined normalized reference value comprising at least one predetermined reference order, the determination of the at least one predetermined reference order comprising dividing at least one predetermined variable reference frequency by the rotational speed of the bearing.

6. The method according to claim 1, wherein the bearing and the monitoring device are located near or in an electrical machine so that the bearing and the monitoring device are subjected to electromagnetic phenomena generated by the electrical machine, the step of filtering comprising comparing the normalized measured value to the at least one predetermined normalized reference value indicative of the electromagnetic phenomena acting on the bearing and the monitoring device according to the frequency of the electromagnetic phenomena.

7. The method according to claim 6, wherein the electrical machine comprises an electrical rotating machine, the method comprising a step of determining the filtering module from features of the electrical rotating machine, the frequency of a grid (G) connected to the machine, the rotating speed of the machine and at least one predetermined integer representative of the range of the at least one predetermined normalized reference value.

8. The method according to claim 7, wherein determining the filtering module comprises:
   determining a first relationship between a first variable, the grid frequency and the predetermined integer,
   determining a second relationship between a second variable, features of the electrical rotating machine, the rotating speed, the grid frequency and the predetermined integer, and determining a third relationship between a third variable, features of the electrical rotating machine, the rotating speed, the grid frequency and the predetermined integer, the first, second and third variables forming the predetermined variable frequencies.

9. The method according to claim 1,
   including outputting a signal indicative of a type of bearing defect.

10. A method for monitoring a bearing coupled to a monitoring device in an electromagnetic field environment comprising:
- operating the bearing in a system that includes an electrical rotating machine,
- measuring at least one vibration frequency of the operating bearing using a vibration sensor,
- outputting a vibration signal from the vibration sensor indicative of the detected vibration frequency,
- normalizing the output vibration signal to produce a normalized vibration signal,
- filtering the normalized vibration signal by a filtering module of the monitoring device to compare the normalized measured value to at least one predetermined normalized reference value indicative of electromagnetic phenomena acting on the bearing and the monitoring device,
- performing a vibration analysis on the vibration signal to detect a bearing defect only if the predetermined normalized reference is not present in the vibration signal, and
- outputting an alarm if the vibration analysis is indicative of a bearing defect.

11. The method according to claim 10, including outputting a signal indicative of a type of bearing defect.

* * * * *